United States Patent [19]

Miron et al.

[11] Patent Number: 4,665,438
[45] Date of Patent: May 12, 1987

[54] PICTURE-IN-PICTURE COLOR TELEVISION RECEIVER

[75] Inventors: Amihai Miron, Ossining; David Koo, Briarcliff Manor, both of N.Y.

[73] Assignee: North American Philips Corporation, New York, N.Y.

[21] Appl. No.: 816,026

[22] Filed: Jan. 3, 1986

[51] Int. Cl.[4] .................. H04N 5/262; H04N 5/272
[52] U.S. Cl. ................................ 358/183; 358/22; 358/181
[58] Field of Search ................ 358/22, 183, 181

[56] References Cited

U.S. PATENT DOCUMENTS

| 4,139,860 | 2/1979 | Micic et al. | 358/183 |
| 4,249,211 | 2/1981 | Baba et al. | 358/183 |
| 4,267,560 | 5/1981 | Ishikawa et al. | 358/22 |
| 4,367,484 | 1/1983 | Kuroyanagi et al. | 358/22 |

OTHER PUBLICATIONS

"TV Receiver Puts Two Pictures on Screen at Same Time", by Ullrich et al; Electronics, vol. 50, No. 18, Sep. 1, 1977, pp. 102–106.

Primary Examiner—James J. Groody
Assistant Examiner—Michael D. Parker
Attorney, Agent, or Firm—Thomas A. Briody; William J. Streeter; Gregory P. Gadson

[57] ABSTRACT

A color television receiver, having a tuner and associated demodulation circuits for both a main picture signal and a picture-in-picture (PIP) signal, uses a single memory for synchronization and for storing a single subsampled field of the PIP signal. Appropriate circuitry is included to selectively adjust the output of the memory to prevent the possible disorder of lines of the resultant PIP signal on display.

7 Claims, 15 Drawing Figures

FIG.6A

| FIELD 1 | FIELD 2 |
|---|---|
| 3 | 264 |
| 6 | 267 |
| 9 | 270 |
| 273 | 12 |
| 276 | 15 |
| 279 | 18 |

FIG.6B

| FIELD 1 | FIELD 2 |
|---|---|
| 264 | 3 |
| 267 | 6 |
| 270 | 9 |
| 273 | 12 |
| 276 | 15 |
| 279 | 18 |

FIG.6C

| FIELD 1 | FIELD 2 |
|---|---|
| 264 | 3 |
| 267 | 6 |
| 270 | 9 |
| 273 | 12 |
| 15 | 276 |
| 18 | 279 |

FIG.7A

| FIELD 1 | FIELD 2 |
|---|---|
| 3 | 264 |
| 6 | 267 |
| 9 | 270 |
| SKIP → 276 | 12 |
| 279 | 15 |
| 282 | 18 |

FIG.7B

| FIELD 1 | FIELD 2 |
|---|---|
| SKIP → 267 | 3 |
| 270 | 6 |
| 273 | 9 |
| 276 | 12 |
| 279 | 15 |
| 282 | 18 |

FIG.7C

| FIELD 1 | FIELD 2 |
|---|---|
| SKIP → 267 | 3 |
| 270 | 6 |
| 273 | 9 |
| DELAY → 12 | 12 |
| 15 | 276 |
| 18 | 279 |

PICTURE-IN-PICTURE COLOR TELEVISION RECEIVER

BACKGROUND OF THE INVENTION

The invention relates to a color television receiver having a first tuner for receiving a first video signal and a display for displaying the first video signal as first frames, each having two sequential fields of spaced scanning lines wherein the scanning lines in a second of the two fields are interlaced in the spaces between the lines in a first of the two fields. This color television receiver further includes a second tuner for receiving a second video signal, means coupled to the second tuner for subsampling the second video signal, and means coupled to the first tuner and the subsampling means for selectively applying the first video signal and the subsampled second video signal to the display. Arranged as such, the first video signal forms on the display the first frames while the subsampled second video signal simultaneously forms on the display second frames substantially smaller than the first frames and replacing a respectively-sized portion of the first frames.

Such a color television receiver is disclosed in U.S. Pat. No. 4,267,560 to Ishikawa et al in which three analog memories are used to store the luminance signal and the color difference signals, respectively, for three successive subsampling fields in the second video signal. It appears that it is necessary to store three successive subsampled fields of the second video signal in order to assure synchronization of the picture resulting from the subsampled second video signal with the picture resulting from the first video signal.

One of the limiting factors in providing consumers with digital television receivers is the cost for manufacturing large-scale memories. Hence, the prior art systems, which require at least one frame or, as in the above patent, one and one-half frames of memory, would be unduly expensive.

SUMMARY OF THE INVENTION

The object of the subject invention is to provide a picture-in-picture (PIP) color television receiver in which the memory therein need only store one subsampled field of the second video signal.

This object is achieved in a color television receiver as described above, characterized in that the means for subsampling the second video signal includes an analog-to-digital (A/D) converter for converting the second video signal into a digital video signal, the A/D converter being controlled by a first clock signal, a memory for storing a portion of a field of the digital video signal, first means coupled to the A/D converter for selectively applying a portion of each field of the digital video signal to the memory, the first applying means also being controlled by the first clock signal, a digital-to-analog (D/A) converter for converting the stored digital video signal to the subsampled second video signal, the D/A converter being controlled by a second clock signal, and second means coupled to the memory for selectively applying the stored digital video signal to the D/A converter, the second applying means also being controlled by the second clock signal, wherein the second clock signal has a frequency which is n times the frequency of the first clock signal, whereby the A/D converter horizontally subsamples the second video signal while the first applying means, in effect, vertically subsamples the second video signal.

Applicants recognize that, while at least two fields of memory are required when synchronization between the first and second video signals is performed in the memory, it is possible to use one field of memory when this synchronization is performed outside of the memory while correcting for any resultant line disorder in the displayed subsampled second video signal with appropriate circuitry.

As a result thereof, the color television receiver as described above is further characterized in that the first applying means includes latch means for selectively applying the digital video signal to the memory, a write counter coupled to the second tuner and clocked with the first clock signal for, in effect, counting the lines in each field of the digital video signal to be stored in the memory, and an address generator coupled to the write counter for generating memory storage addresses for the digital video signal; the second applying means includes latch means for selectively applying the stored digital video signal to the D/A converter, a read counter clocked with the second clock signal for, in effect, counting the lines in each field of the stored digital video signal to be read from the memory, and an address generator coupled to the read counter for generating the memory storage addresses of the stored digital video signal, the television receiver further including a comparator coupled to the write and read counters for indicating when the contents of the read counter exceeds the contents of the write counter, first and second field determining circuits coupled, respectively, to the first and second tuners for determining the occurrences of the first and second fields, respectively, in the first and second video signals, respectively, a field compensation circuit coupled to the first and second field determining circuits and the comparator for selectively incrementing and decrementing the read counter, and a control circuit coupled to the latches, the read and write counters and the means for selectively applying the first video signal and the subsampled second video signal to the display, whereby, when the first field determining circuit indicates a first field and (a) the second field determining circuit indicates a second field, the field compensation circuit increments the contents in the read counter by one line, (b) the second field determining circuit indicates a first field and the read counter contents is greater than the write counter contents, the field compensation circuit increments the read counter contents by one line, (c) the second field determining circuit indicates a second field and the read counter contents is greater than the write counter contents, the field compensation circuit decrements the read counter contents by one line.

DESCRIPTION OF THE DRAWINGS

With the above and additional objects and advantages in mind as will hereinafter appear, the subject invention will be described with reference to the accompanying drawings in which:

FIGS. 6A–6C show various displays for the subsampled video signal in which there are line disorders;

FIGS. 7A–7C show various displays as in FIGS. 6A–6C in which the line disorders are corrected;

DESCRIPTION OF THE PREFERRED EMBODIMENT

Figure 1:
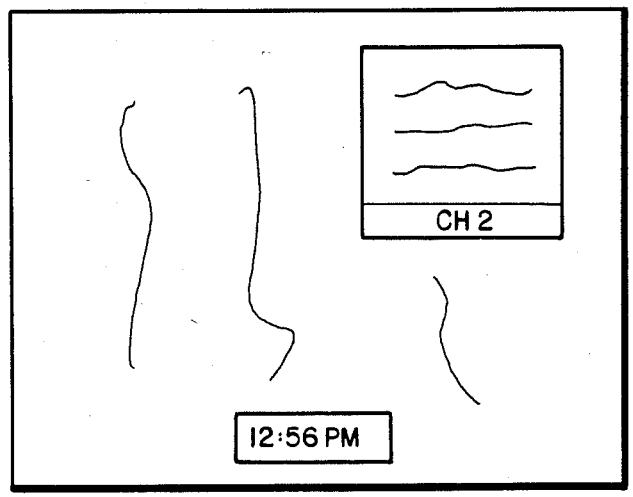
FIG. 1 illustrates the display of a color television receiver incorporating the invention, showing the picture from the second video signal within the picture from the first video signal.
Figure 3:
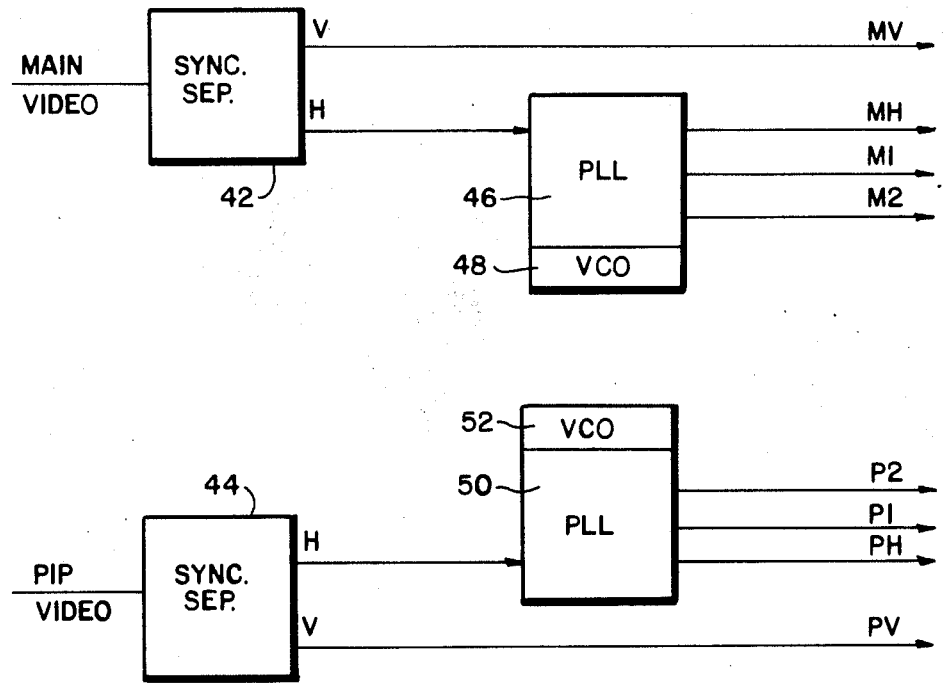
FIG. 3 is a block diagram of a clock signal generator for use in the color television receiver.

In late 1983, it was realized that Picture-in-Picture (PIP) is one of the most practical features for implementation in television receivers. The PIP feature enables the viewer to watch, simultaneously, two pictures on the television screen. One picture is the normal (or main) channel to which the television receiver is tuned while the second picture (PIP) can be a second channel or any other video source (VCR, video camera, etc.). As shown in FIG. 1, the second picture is reduced in size to approximately one-ninth of the screen, or the original picture. The viewer may independently tune the two channels and, when desired, switch between the two channels on display. One use might be to scan the available programming using the PIP while watching the program of the first picture.

In general there are two methods for providing PIP. In a first method, used in the prior art, the memory stores at least two subsampled fields of active video, and read and write cycles can be performed simultaneously and independently during one memory cycle. The incoming video of the PIP channel is written into the memory sequentially, and the memory is read in synchronism with the main channel. As a result, two interlaced 60 Hz fields are displayed as the PIP channel.

In the second method used in the present invention, the memory stores only one subsampled field of active video. However, read and write cycle can still be done simultaneously and independently during one memory cycle. As a result, the display is updated at a 60 Hz rate, however, each field in the display contains information from two different fields. The point at which one field ends and the other starts, moves in time corresponding to the asynchronous relation between the PIP and main channels, but this movement is very slow and is not capable of being noticed. This breaking point between the fields is visible only when the displayed information contains very fast motion, or there is a camera switch or editing point.

Figure 2:
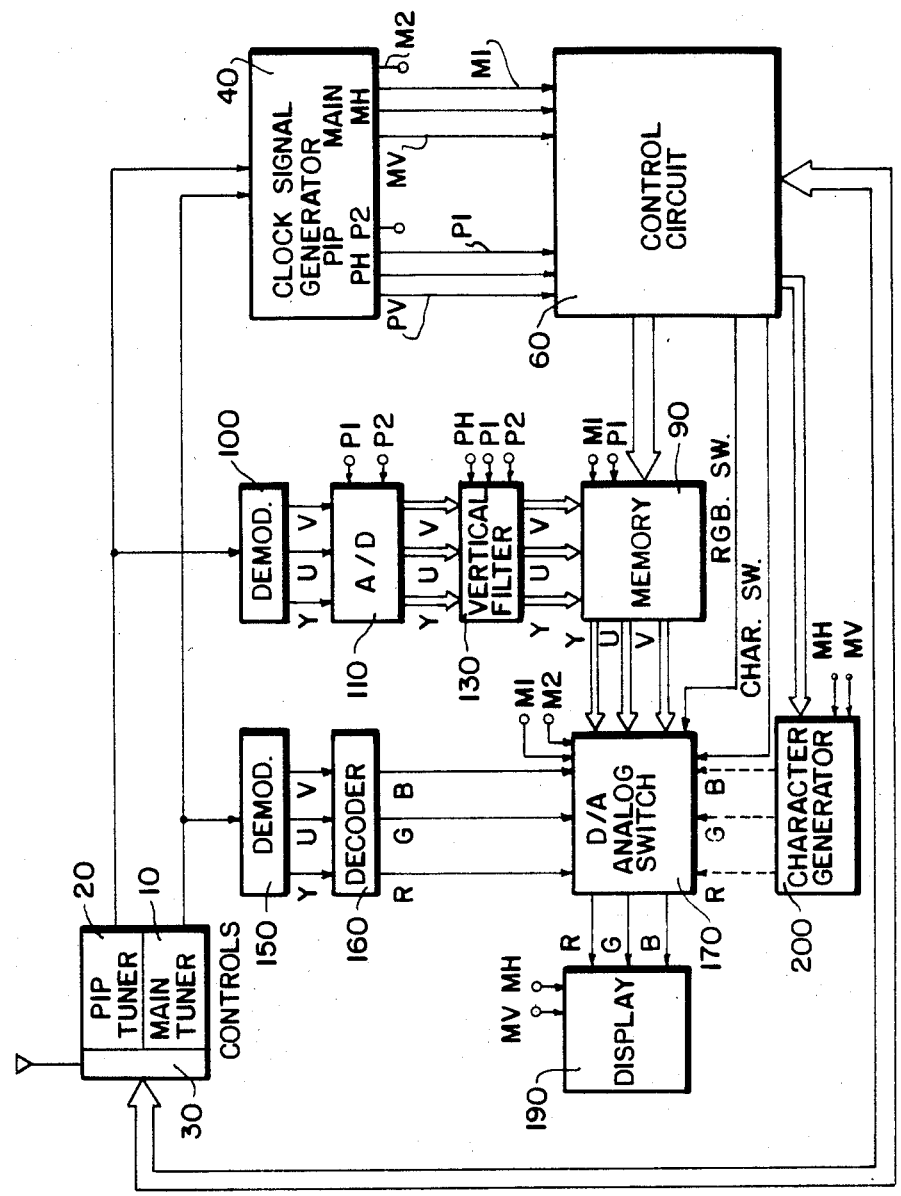
FIG. 2 is a block diagram of a color television receiver incorporating the invention.

Referring now to FIG. 2, the PIP color television receiver includes a first (main) tuner 10 for tuning to a first video signal constituting a main channel and a second (PIP) tuner 20 for tuning to a second video signal constituting a PIP channel, the first and second tuners 10 and 20 being controlled by controls 30. The first and second video signals are then applied to a clock signal generator 40 for producing the various clock signals used in the PIP color television receiver.

The clock signal generator 40 is a dual-channel device and includes a first and a second sync. separation circuit 42 and 44 for recovering the horizontal and vertical synchronizing signals from the first and second video signals, respectively. The vertical synchronizing signals of the first and second video signals are applied directly to outputs MV and PV, respectively, of the clock signal generator 40, while the horizontal synchronizing signals of the first video signal are applied to a first phase-locked loop 46, having an associated voltage-controlled oscillator (VCO) 48, for producing horizontal synchronizing signals MH as well as clock signals M1 and M2. Similarly, the horizontal synchronizing signals of the second video signal are applied to a second phase-locked loop 50, also having an associated voltage-controlled oscillator (VCO) 52, for producing horizontal synchronizing signals PH as well as clock signals P1 and P2.

The perceived bandwidth of the PIP picture should be close to that of the main picture. For an NTSC video signal, the bandwidth of the luminance signal component (Y) at the receiver is approximately 4 MHz. This is also the bandwidth of the CRT driver circuits and, on consumer television receivers, this is the highest frequency that is visible on the CRT. Since the PIP signal is compressed by a factor of three in the horizontal direction, the required bandwidth to be acquired in the PIP luminance signal component is one-third of 4 MHz, or approximately 1.3 MHz. Similarly, the color difference signals (U,V) have a bandwidth at the receiver of approximately one-eighth of the luminance signal component, or about 0.5 MHz. Again, since the PIP signal is compressed by one-third, the required bandwidth to be acquired in the PIP color difference signals U, V is approximately 0.17 MHz.

In order to determine the frequency of the clock signal P1, which is the sampling frequency of the PIP luminance signal component (Y), after determining the bandwidth thereof, one must first approximate the number of samples of Y per active line (n). Assuming a memory size of 12K bits for each quantization bit of a subsampled field of the Y signal and 80 lines in each subsampled field, $$n' = 12K/80 = 153.6 \text{ samples.}$$

Since n has to be a multiple of 8 due to the 8:1:1 ratio between the bandwidths of the Y, U and V signal components, n is chosen as follows:

$$n = 19 \times 8 = 152.$$

The sampling frequency P1 is then approximated as follows:

$$P1' = 152/50\mu s = 3.04 \text{ MHz}$$

where 50/us is the time of an active line without overscan.

Since the sampling frequency P1 is locked to the line frequency of the PIP signal, wherein the line frequency $F_h$ is:

$$F_h = 4.5 \times 10^6/286 = 15{,}734.266 \text{ Hz.}$$

and $$P1'/F_h = 193.2089$$

Since this multiplying number should be a multiple of 8, $$24 \times 8 = 192$$

hence

P1 = 192 × $F_h$ = 3.021 MHz, and

P2 = P1/8 = 0.3776 MHz.

Keeping in mind that the PIP picture is compressed by one-third, the clock signal M1 for the main channel luminance signal component (Y) is:

M1 = P1 × 3 = 9.063 MHz while the clock signal M2 for the main channel color difference signal components (U,V) is:

M2 = P2 × 3 = 1.1328 MHz.

Referring back to FIG. 2, the clock signals PV, PH, P1, MV, MH and M1 are applied to a control circuit 60 for generating address and control signals for the memory 90.

Figure 8A:
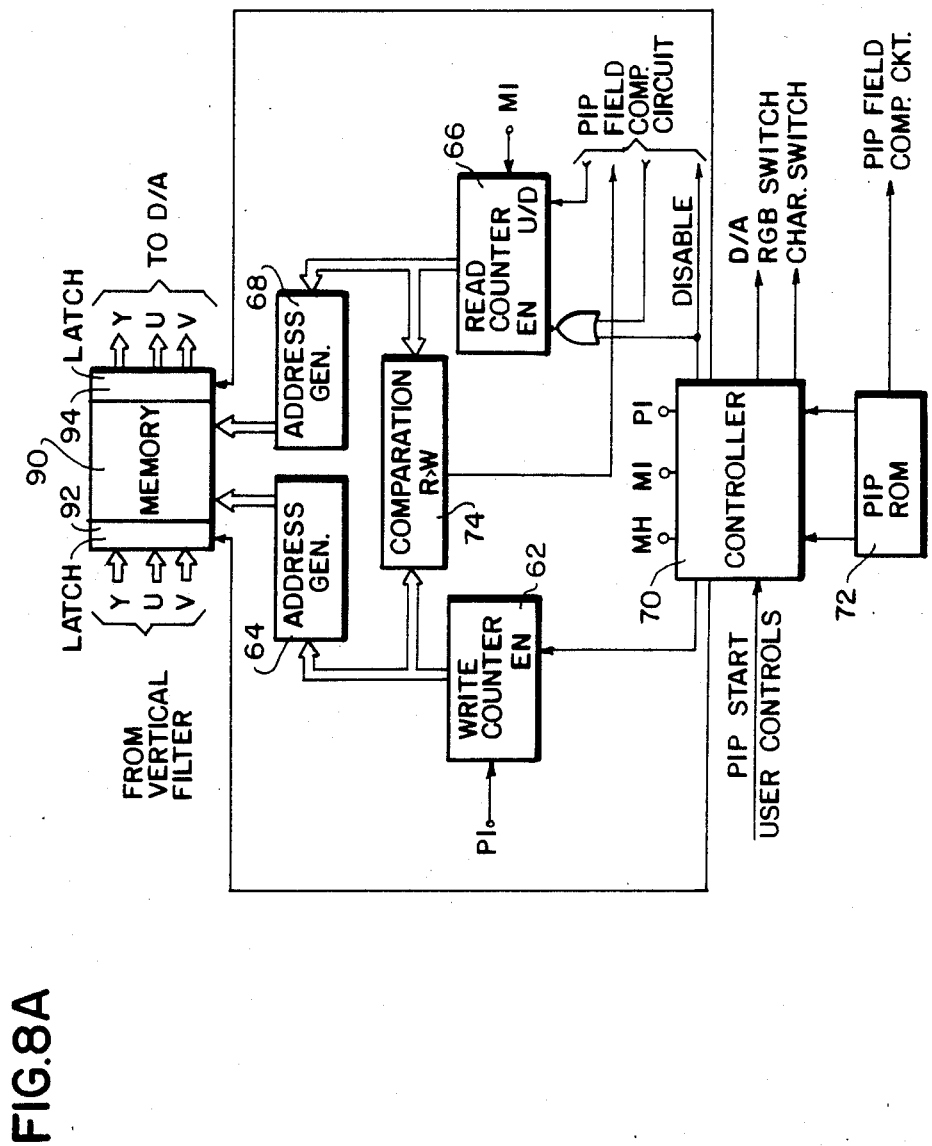
FIGS. 8A and 8B are block diagrams of the control circuit of FIG. 2.
Figure 8B:
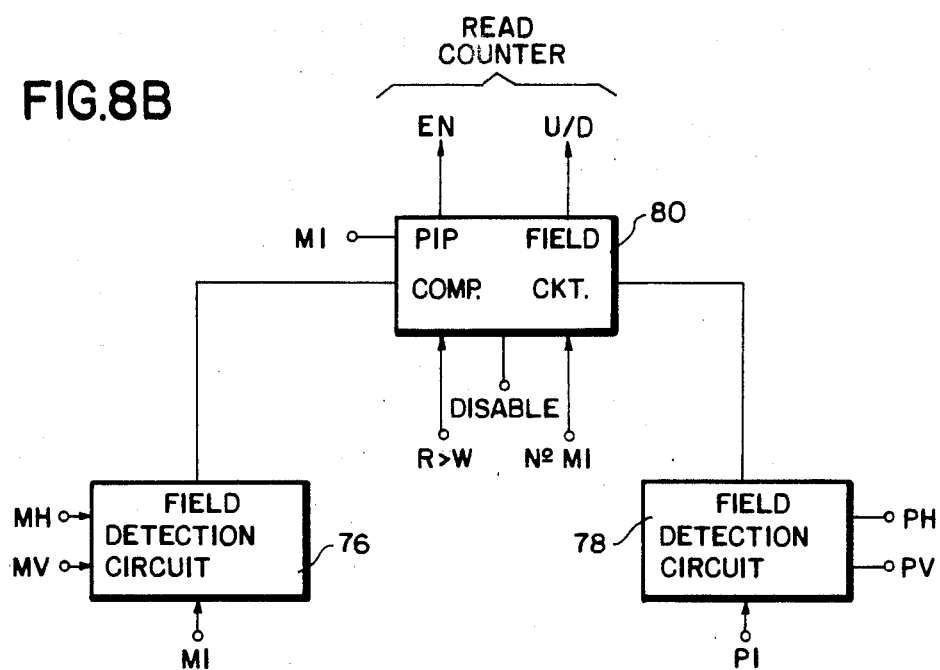

As shown in FIG. 8A, the control circuit 60 includes a write counter 62 coupled to an address generator 64 for generating successive addresses for the second video signal applied to the memory 90. The counter 62 is clocked by the signal P1. In addition, the control circuit 60 includes a read counter 66 clocked with the signal M1 and coupled to an address generator 68 for generating successive addresses for reading the video signal stored in the memory 90. A controller 70 coupled via an OR-gate 71 to the enable (EN) input of the read counter 66, selectively enables the read counter 66 under control of a PIP ROM 72 which supplies information relating to the size and positioning of the PIP picture within the main picture. Since the memory 90 stores at least one field of information from the PIP signal, it is relatively easy to provide a "freeze-frame" feature to the television receiver. The controller 70 is connected to the enable (EN) input of the write counter 62. Upon application of a user control signal, the controller 70 suspends operation of the write counter 62 preventing further addresses from being generated by the address generator 64.

As indicated above, the main channel and the PIP channel are not synchronized with each other. This combined with the facts that the memory 90 only stores one subsampled field of video information and the read counter operates three times faster than the write counter 62, line disorders may occur when, on display, a first field of the main signal is being scanned while the memory 90 contains part or all of the information in a second field of the PIP signal.

Figures 4, 5:
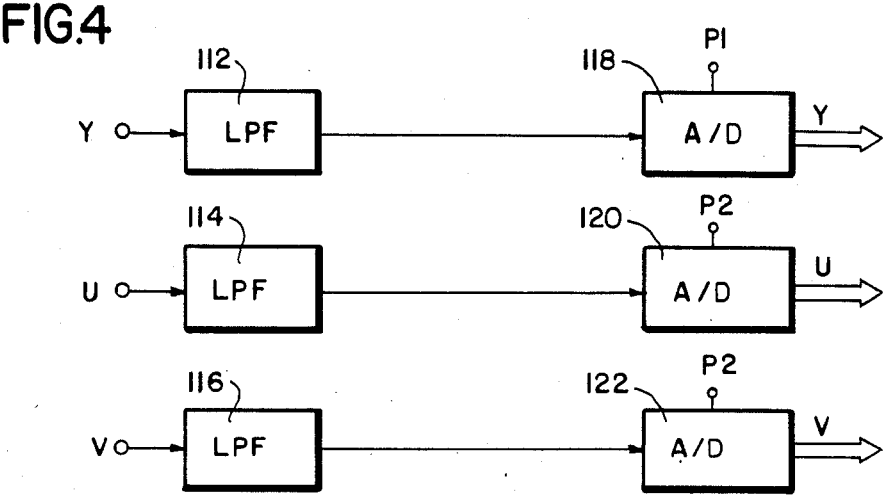
FIG. 4 is a block diagram of an analog-to-digital converter for the color television receiver.
FIG. 5 is an illustration of the display for the subsampled video signal showing the organization of the lines in each field therein.

FIG. 5 illustrates the proper line organization on display of a frame in the PIP signal. Line disorder occurs when, as shown in FIGS. 6A-6C, the display in the television receiver is scanning a first field of the main signal and (1) a first field of the PIP signal is being written into the memory 90 and the read counter 66 contents overtakes the write counter 62 contents, (2) a second field is written in the memory 90, (3) a second field is being written into the memory 90 and the read counter 66 contents overtakes the write counter 62 contents. In case (1) as shown in FIG. 6A, lines 273–279 in a first field are shown as being positioned below lines 12–18 in a second field while in the proper line orientation, lines 273–279 should be above lines 12–18 (see FIG. 5). FIG. 7A shows that by skipping line 273, a proper line orientation is achieved. In case (2) as shown in FIG. 6B, all the lines 264–279 are disoriented with respect to the lines 3–18. FIG. 7B shows that by skipping line 264, the proper line orientation is achieved. Finally, in case (3) as shown in FIG. 6C, lines 264–273 are disoriented with respect to lines 2–12 while lines 15 and 18 are properly oriented when compared with lines 276 and 279. FIG. 7C shows that by initially skipping line 264 and then delaying after line 273 (causing new line 12 to be read from the same address), the proper line orientation is achieved.

The control circuit 60 includes circuitry for performing this correction. A comparator 74 compares the outputs of the write and read counters 62 and 66 and generates a signal when the read counter 66 contents exceed the write counter 62 contents. A first field detection circuit 76 receives the clock signals MH, MV and M1 and generates a signal indicating the occurrence of a first and a second field in the main signal. Similarly, a second field detection circuit 78 receives the clock signal PH, PV and P1 and generates a signal indicating the occurrence of a first and a second field in the PIP signal. A PIP field compensation circuit 80 receives the outputs of the first and second field detection circuits 76 and 78 and the comparator 74 and, under control of a signal from the PIP ROM 72 indicating the number of clock signals M1 in a line of the subsampled PIP signal, and clock signal M1, causes the read counter 66 to increment or decrement the equivalent of one line. For this purpose, the read counter 66 is an up/down counter and the PIP field compensation circuit 80 is connected to the enable (EN) input thereof, via OR-gate 71, as well as to the counting direction (U/D) input thereof. It should be noted that normally the read counter 66 is enabled by the controller for the duration of only one-third of a full scanning line on display. During the remaining period of time in each line, the PIP field compensation circuit 80 is then able to increment or decrement the read counter 66. Hence, the read counter 66 enable output of controller 70 is also connected to a disable input of the PIP field compensation circuit 80.

Referring back to FIG. 2, the PIP signal is further applied to a demodulator 100 for recovering the luminance (Y) and color difference (U, V) signals therein. These signals are then applied to an analog-to-digital (A/D) converter circuit 110 which includes low-pass filters 112, 114 and 116 for receiving the signals Y, U and V (FIG. 4). Low-pass filter 112 has a cut-off frequency of 1.3 MHz while low-pass filters 114 and 116 have cut-off frequencies of 0.17 MHz. The outputs of these filters 112, 114, 116 are applied to respective A/D converters 118, 120 and 122. Due to the limited bandwidth of the luminance and color difference signals, A/D converters 118, 120 and 122 need only provide 5 bits of quantization. The A/D converter 118 is clocked with the clock signal P1 while the A/D converters 120 and 122 are clocked with the clock signal P2 (due to the 8:1:1 ratio of samples in the L, U and V signals).

Figure 9:
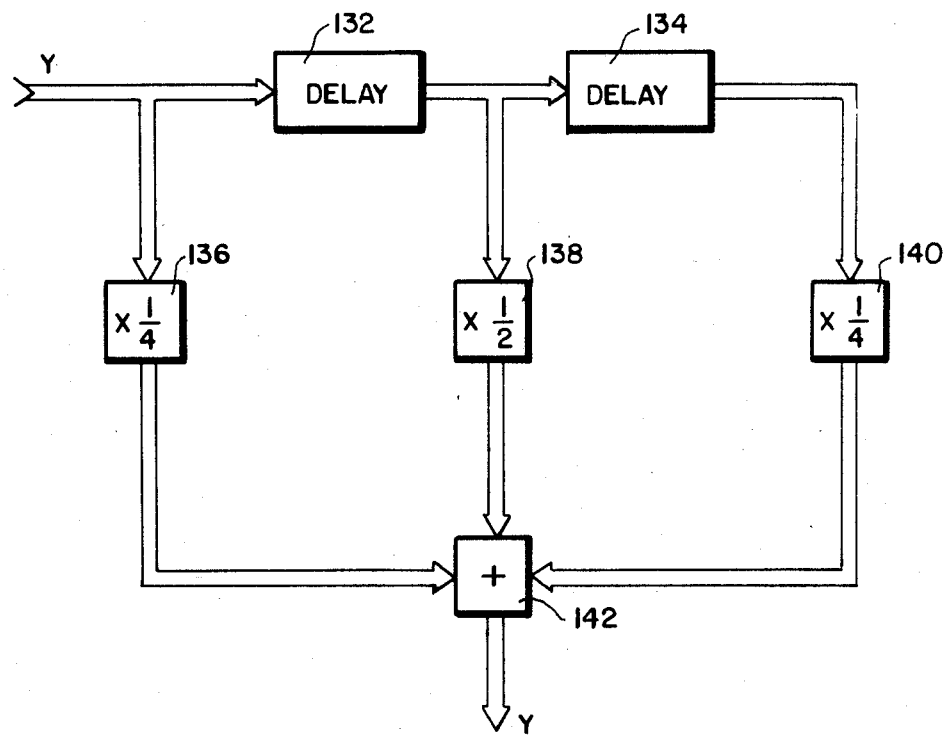
FIG. 9 is a block diagram of the vertical filter of FIG. 2.

The outputs from the A/D converter circuit 110 are then applied to a vertical filter circuit 130. FIG. 9 shows an implementation of the filter applied to the luminance signal; the color difference signals U and V are not subjected to filtering but rather are just delayed to compensate for the delay in the luminance signal. The filter comprises two serially arranged line delays 132 and 134. The input Y signal is applied to the delay 132 and also to a scaler 136 which multiplies the Y signal by ¼. The output from delay 132 is applied to delay 134 and further to a scaler 138 which multiplies this output signal by ½. The output from the delay 134 is applied to a scaler 140 which multiplies this output signal by 1/4. Finally, the outputs from the scalers 136, 138 and 140 are combined in adder 142, the output of which forms the vertically filtered Y signal.

As shown in FIG. 8A, memory 90 further includes latch circuits 92 and 94 controlled by controller 70 for gating the Y, U, V signals into and out of the memory 90 in synchronism with the write counter 62 and the normally operating read counter 66, respectively.

As shown in FIG. 2, the main signal is further applied to a demodulator 150 for recovering the luminance and color difference signals therein. These signals are then applied to a color decoder 160 for recovering the red (R), green (G) and blue (B) color signals.

Figure 10:
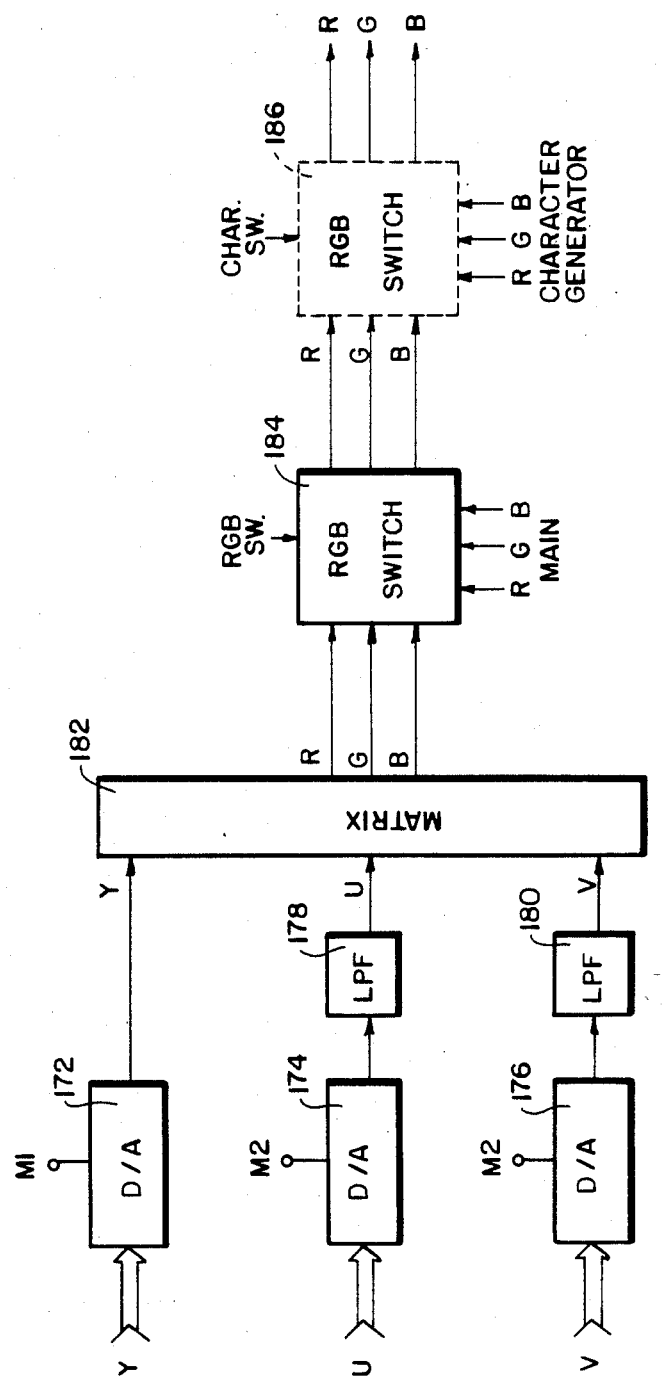
FIG. 10 is a block diagram of the A/D converter and analog switch of FIG. 2.

The outputs from decoder 160 and the memory 90, via latch 94, are applied to a digital-to-analog (D/A) converter and analog switching circuit 170. Referring to FIG. 10, the signals Y, U and V from memory 90 are applied to respective D/A converters 172, 174 and 176, D/A converter 172 being clocked with the clock signal M1 while D/A converters 174 and 176 are clocked with the clock signal M2. The color difference signal outputs of D/A converters 174 and 176 are filtered in low-pass filters 178 and 180, each having a cut-off frequency of 0.5 MHz, and are then applied, along with the luminance signal from D/A converter 172 to a matrix circuit 182 for recovering the R, G, B color signals. These PIP RGB signals and the main RGB signals are then applied to the selection inputs of an RGB switch 184 controlled by a signal from controller 70 in response to the PIP ROM 72.

The output from the RGB switch 184 is then finally, applied to a display 190 whose scanning is controlled by clock signals MH and MV.

As shown in FIG. 1, it may be desirable to selectively show on the display 190, the time of day, the main channel indication and/or the PIP channel indication. To this end, a character generator 200 is provided which is controlled by signals from the control circuit 60, which receives channel indications from the controls 30. For inserting the output RGB signals from the character generator 200 into the display 190, the D/A converter and analog switching circuit 170 includes a second RGB switch 186 having selector inputs coupled to the outputs of the RGB switch 184 and the character generator 200. Under control of a switching signal from controller 70, RGB switch 186 selectively applies the output of RGB switch 184 and the character generator 200 to the display 190.

Numerous alternations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

What is claimed:
1. A television receiver having
 a first tuner for receiving a first video signal; and
 a display device for displaying said first video signal as first frames each having two fields of spaced scanning lines wherein the scanning lines in a second of said two fields are interlaced in the spaces between the lines in a first of said two fields;
 said television receiver further having a second tuner for receiving a second video signal;
 means coupled to said second tuner for subsampling said second video signal; and
 means coupled to said first tuner and said subsampling means for selectively applying said first video signal and said subsampled second video signal to said display;
 whereby said first video signal forms on said display said first frames while said subsampled second video signal simultaneously forms on said display second frames substantially smaller than said first frames and replacing a respectively-sized portion of said first frames, characterized in that said means for subsampling said second video signal comprises:
 an analog-to-digital (A/D) converter for converting said second video signal into a digital video signal, said (A/D) converter being controlled by a first clock signal;
 a memory for storing a portion of each field of said digital video signal;
 first means coupled to said A/D converter for selectively applying said portion of each field of said digital video signal to said memory, said first applying means also being controlled by said first clock signal;
 a digital-to-analog (D/A) converter for converting said stored digital video signal into said subsampled second video signal, said D/A converter being controlled by a second clock signal; and
 second means coupled to said memory for selectively applying said stored digital video signal to said D/A converter, said second applying means also being controlled by said second clock signals;
 wherein said second clock signal has a frequency which is n times a frequency of said first clock signal, whereby said A/D converter horizontally subsamples said second video signal while said first means for applying said portion of each field of said digital video signal to said memory effectively vertically subsamples said second video signal.

2. A television receiver as claimed in claim 1, wherein said television receiver corrects any line disorder in the displayed subsampled second video signal, characterized in that said first applying means comprises first latch means for selectively applying said digital video signal to said memory, a write counter clocked with said first clock signal for, in effect, counting the lines in each field of said digital video signal to be stored in said memory, and an address generator coupled to said write counter for generating memory storage addresses for said digital video signal; said second applying means comprises second latch means for selectively applying said stored digital video signal to said D/A converter, a read counter clocked with said second clock signal for, in effect, counting the lines in each field of said stored digital video signal to be read from said memory, and an address generator coupled to said read counter for generating memory storage addresses of said stored digital video signal; said television receiver further comprising a comparator coupled to said write and read counters for indicating when the contents of said read counter exceeds the contents of said write counter, first and second field determining circuits coupled, respectively, to said first and second tuners for determining the occurrences of the first and second fields, respectively, in said first and second video signals, respectively, incrementing and decrementing means coupled to said first and second field determining circuits and said comparator for selectively incrementing or decrementing said read counter, and a control circuit coupled to both of said latch means, said write and read counters, and said means for selectively applying said first video signal and said subsampled second video signal to said display, whereby when said first field determining circuits indicates a first field and (a) said second field determining circuit indicates a second field, said incrementing and decrementing means increments the contents of said read counter by the equivalent of one line, (b) said second field determining circuit indicates a first field and said read counter contents is greater than said write counter contents, said incrementing and decrementing means increments the contents of said read counter by the equivalent of one line, and (c) said second field determining circuit indicates a second field and said read counter contents is greater than said write counter contents, said incrementing and decrementing means decrements said read counter by the equivalent of one line.

3. A television receiver as claimed in claim 2, characterized in that said control circuit causes said first latch means to selectively apply a limited number of lines in said digital video signal to said memory thereby vertically subsampling said second video signal.

4. A television receiver as claimed in claim 3, characterized in that said control circuit causes said first latch means to selectively apply one out of every three lines in said digital video signal to said memory.

5. A television receiver as claimed in claim 1, 2, 3 or 4, characterized in that said television receiver further comprises a vertical filter coupled between said memory and said A/D converter to reduce aliasing in said subsampled video signal on display.

6. A television receiver as claimed in claim 2, 3 or 4, characterized in that said control circuit selectively enables said read counter and said means for applying said first video signal and said subsampled second video signal to said display for controlling the positioning of said second frame within said first frame.

7. A television receiver as claimed in claim 1, characterized in that the frequency of said second clock signal is three times the frequency of said first clock signal.

* * * * *